Jan. 13, 1970     H. J. PROXMIRE     3,488,839
METHOD OF MAKING A TAP CONNECTION TO A WINDING
OF A VARIABLE TRANSFORMER
Filed Nov. 24, 1967
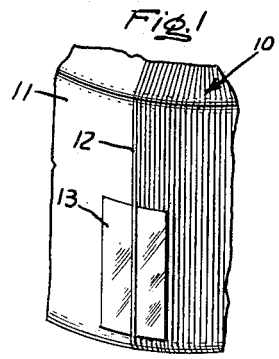
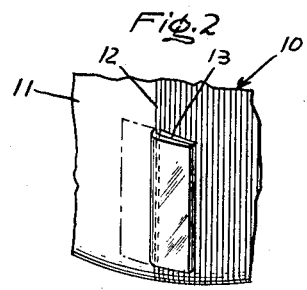
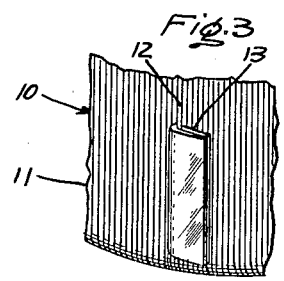
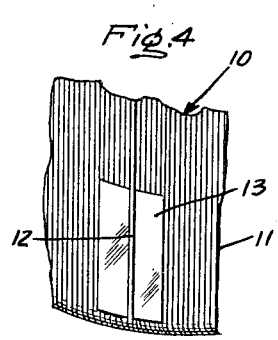
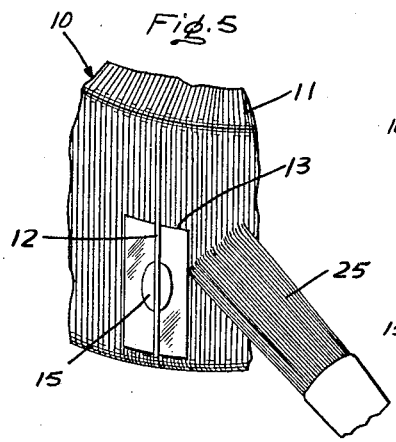
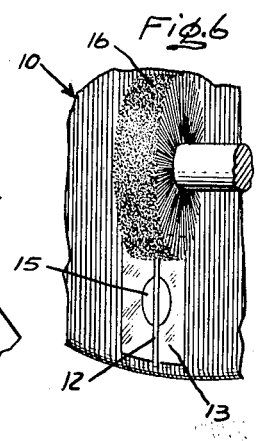
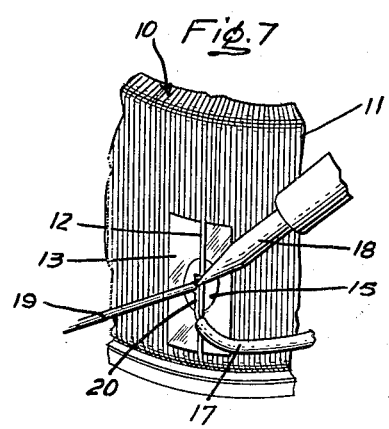
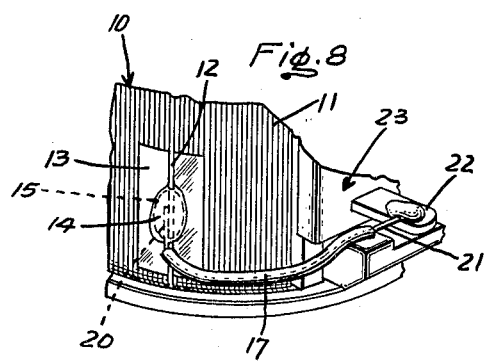
INVENTOR.
Harry J. Proxmire,
BY
Attorney.

United States Patent Office 3,488,839
Patented Jan. 13, 1970

3,488,839
METHOD OF MAKING A TAP CONNECTION TO A WINDING OF A VARIABLE TRANSFORMER
Harry J. Proxmire, Fort Wayne, Ind., assignor to General Electric Company, a corporation of New York
Filed Nov. 24, 1967, Ser. No. 685,680
Int. Cl. H01r 43/00
U.S. Cl. 29—605
6 Claims

ABSTRACT OF THE DISCLOSURE

An electrical connection to a winding of a variable transformer is made by interposing a strip of insulating material between a preselected turn to which an electrical connection is to be made and the adjacent turns. A backup member of electrically conductive material, such as copper, is placed between the portion of the preselected turn and the strip of insulating material. The strip of insulating material is bonded with a resin adhesive to the adjacent turns of the winding and also the backup member is bonded to the insulating strip. The portions of the backup member and the turn to be soldered are then buffed to remove the bonding adhesive and electrical insulation. The electrical connection is made by soldering a conductor to the buffed portions of the preselected turn and the backup member.

BACKGROUND OF THE INVENTION

This invention relates to methods for making a tap connection to a winding of a variable transformer. More particularly, it relates to a method for making a tap connection to a variable autotransformer wherein an external insulated lead is securely connected in good electrical engagement with a turn of the autotransformer winding.

Variable autotransformers are widely used for many different purposes, as for example, for the control of voltage in both low and high voltage alternating current applications. The adjacently disposed successive turns of the winding of the variable autotransformer form a commutating surface or track on which a brush is selectively positioned to obtain the desired voltage. In such adjustable autotransformers the winding is generally tightly wound over an insulating shell disposed around the magnetic core. It will be understood that after the autotransformer winding is wound over the core it is necessary to connect an external lead to a turn that will provide the predetermined number of turns for the primary winding. The external lead is then brought to a terminal board where the connections to an external power source and to a load are made. Usually the tap connections are made after the winding and core assembly of the variable transformer have undergone a varnish treatment. Problems have been encountered in effecting a secure electrical connection between the lead and a specific turn of the winding because of the difficulty in thoroughly removing the treatment material and insulation coating in the vicinity of the solder joint.

Accordingly, it is a general object of my invention to provide a method of making a connection to a turn of a winding on an annular core or the like.

A more specific object of my invention is to provide a method for effecting a tap connection on a winding of a variable transformer wherein the good mechanical and electrical engagement is achieved between the external lead and a turn of the winding.

SUMMARY OF THE INVENTION

In accordance with one form of my invention I have provided a method for making an electrical connection to a winding of a variable transformer that includes the steps of: (1) interposing a strip of insulating material between adjacent turns of the winding and a preselected turn to which the electrical connection is to be made, (2) placing a backup member of electrical conductive material between the portion of the preselected turn and the strip of insulating material, (3) bonding the strip of insulating material to the adjacent turns of the winding and further bonding the backup member to the strip of insulating material, (4) buffing the portions of the backup member and the turn to be soldered to bare the surfaces of the conductive material for making an electrical connection, and (5) connecting a conductor to the bared portions of the turns and the backup member.

An important advantage of the invention is that the making of a secure electrical solder connection to a preselected turn of tightly wound conductor of a winding on an annular core is facilitated, particularly where the wound conductor is relatively fine wire. Also, the quality and reliability of the solder joint is improved by the practice of the present method.

The subject matter which I regard as my invention is set forth in the appended claims. The invention itself, however, together with other objects and advantages may be better understood by referring to the following description taken in conjunction with the accompanying drawing in which:

BRIEF DESCRIPTION OF THE DRAWING

FIGURE 1 is an illustration of a portion of a winding and core assembly of a variable transformer showing an initial operation to start making the electrical connection in accordance with my invention;

FIGURE 2 is a view corresponding to the view shown in FIGURE 1 illustrating another operation carried out to interpose the strip of insulating material between the preselected turn and the adjacent turns of the winding;

FIGURE 3 is a view corresponding to FIGURE 2 illustrating the succeeding operation of continuing with the winding of the annular core while the insulating strip is folded over;

FIGURE 4 is a view corresponding to FIGURE 3 illustrating an operation wherein the insulating strip is folded back so that it now overlies the winding on both sides, the preselected turn to which the tap connection is to be made being disposed on the insulating strip;

FIGURE 5 illustrates a copper backup plate in place between the preselected turn and insulating strip, and the step of bonding the insulating strip to the winding and backup member to the insulating strip;

FIGURE 6 illustrates a preferred way of effecting the step of baring the portion of the preselected turn and backup member to be soldered to a conductor;

FIGURE 7 illustrates the step of soldering an external lead to the bared portion of backup plate and preselected turn; and FIGURE 8 shows the soldered tap connection as achieved by the illustrated method embodying my invention.

DECRIPTION OF THE PREFERRED EMBODIMENT

Having more specific reference now to the drawing, I will now more fully describe one form of my invention as applied to a tap connection for an autotransformer winding 10. In FIGURE 1 I have shown a portion of an annular magnetic core 11 in the process of being wound to provide the predetermined number of turns required for the primary winding of the autotransformer, the turn 12 at the left side is seen in FIGURE 1 being the preselected turn to which the tap connection is to be made. A more specific description of a variable autotransformer in which my method may be utilized may be found in U.S. Patent 3,185,948 granted to H. J. Helberg on May 25, 1965 and incorporated herein by reference.

A strip 13 of insulating material is inserted under the preselected turn 12 to which the tap connection 14 (see FIGURE 8) is going to be made and then the left portion shown in dashed outline in FIGURE 2 is folded over so that the preselected turn 12 is between the folds of the insulating strip 13. After this is done, additional turns are wound around the core, as will be seen in FIGURE 3. If desired, the winding operation may be carried out to its completion.

With turns disposed on both sides of the preselected turn 12, the folded over portion of the insulating strip 13 may be folded back to the position as shown in FIGURE 4. It will be appreciated that the sequence of operations illustrated in FIGURES 1 through 4 may be eliminated in those core and coil assemblies where it is possible to slip the insulating strip 13 under the preselected turn 12. Insulating strip 13 may be made of any suitable insulating material such as a polyester resin made by the condensation of terephthalic acid and ethylene glycol or other synthetic resin film with suitable insulating properties.

In the preferred embodiment of the invention, the step of bonding a backup member 15 of conductive material, such as copper, is carried out by allowing the epoxy resin used to bond the winding to the insulating shell to flow over and under the insulating strip 13, the backup member 15 and turn 12. The core and winding assembly may then be cured to thereby bond not only the winding to the insulating shell but also to bond turn 12 to the insulating strip and backup member 15, to bond the backup member 15 to the insulating strip 13, and also to bond the insulating strip 13 to the winding 10. Although in the exemplification of my invention a liquid epoxy resin is applied by a brush 25, it will be appreciated that other suitable means may be used to apply the resin adhesive or other bonding material. Where the winding 10 is subjected to a conventional varnish treatment, a portion of the preselected turn 12, the backup member 15 and the insulating strip 13 are preferably coated with a protective coating that can be removed to bare the metallic surfaces for soldering.

After the resin or varnish treatment, the portion of the turn 12 to which the electrical connection is to be made is stripped of insulation and resin to bare the surface to be connected. Also, the front surface of the backup member 15 is stripped of insulating material. Preferably, the surface preparation is effected by buffing the surfaces with a polishing wheel 16 comprised of a nylon mat impregnated with silicon carbide or of any other means that will effectively remove the insulation and resin without any appreciable removal of the copper conductor material. In FIGURE 6 a buffing wheel 16 which was driven by a portable motor (not shown) is illustrated in position over the backup member 15 and is brought in contact therewith manually.

As is shown in FIGURE 7, one termination 20 of insulated lead wire 17 is now placed along the bared portion of the preselected turn 12 and heat is applied to the bared portions by a soldering iron 18. After the bared portions have been heated sufficiently, solder 19 is applied to complete the tap connection 14 as shown in FIGURE 8. It will be seen that the other termination 21 of insulated lead 17 is connected to a terminal 22 of terminal board 23 to which the external circuit connections are made.

From the foregoing description of the preferred embodiment of my invention, it will be apparent that a method is provided for effecting a secure and reliable tap connection to a turn of a winding of a variable transformer that securely bonds an external lead thereto and is especially adaptable to windings of relatively small wire size. Although I have described the method in connection with a preferred embodiment thereof, it will be apparent that many modifications of the invention may be made. For example, it will be apparent to those skilled in the art that the backup ember may be provided with tabs to mechanically lock the termination of an external lead. It will be understood that the specific exemplification of the invention which I have described herein is intended for illustrative purposes only and that many modifications may be made. It is, therefore, intended in the appended claims to cover all such modifications that fall within the true spirit and scope of my invention.

What I claim as new and desire to secure by Letters Patent of the United States is:

1. A method of making an electrical connection to a winding of a variable transformer, said method comprising the steps of: interposing a strip of insulating material between the turn to which the electrical connection is to be made and turns adjacent thereto, placing a backup member of electrically conductive material between the portion of said turn and said strip of insulating material, bonding at least said strip to said winding and said backup member to said strip, buffing said portion of the backup member and turn to which the electrical connection is to be made thereby to remove resin adhesive and insulation therefrom, and connecting a conductor to said buffed portions of the turn and said backup member.

2. The method set forth in claim 1 wherein said backup member is comprised of copper.

3. The method set forth in claim 1 wherein an epoxy resin is used to bond said strip of insulating material to said winding and said backup member to said strip.

4. A method of making an electrical connection to a preselected turn of a winding of a variable transformer having an annular core, said method comprising the steps of: winding turns on the annular core until the preselected turn is reached, folding a strip of insulating material over a portion of the preselected turn whereby the folded over side overlies the turns on one side of the preselected turn, winding additional turns thereby to form turns on the other side of said preselected turn, bonding said insulating strip to the turns on both sides of said preselected turn and also bonding a backup member of electrically conductive material between said preselected turn and said strip of insulating material, buffing the portion of the backup member and preselected turn to bare the portions of the conductive material for soldering, and soldering a conductor to the bared portions of said preselected turn and backup member.

5. The method set forth in claim 4 wherein said backup member is comprised of copper.

6. The method set forth in claim 4 wherein an epoxy resin is used to bond said strip of insulating material to said adjacent turns of the winding and to bond said backup member to said strip.

References Cited

UNITED STATES PATENTS

| | | | |
|---|---|---|---|
| 2,985,950 | 5/1961 | Duman | 29—605 |
| 3,142,030 | 7/1964 | Lenox et al. | 336—192 X |

JOHN F. CAMPBELL, Primary Examiner

V. A. DiPALMA, Assistant Examiner

U.S. Cl. X.R.

29—628